(12) United States Patent
Buck et al.

(10) Patent No.: US 10,502,266 B2
(45) Date of Patent: Dec. 10, 2019

(54) TORQUE TRANSMISSION ARRANGEMENT

(71) Applicant: AUDI AG, Ingolstadt (DE)

(72) Inventors: Michael Buck, Ingolstadt (DE); Oliver Kleemann, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 284 days.

(21) Appl. No.: 15/520,969

(22) PCT Filed: Oct. 23, 2015

(86) PCT No.: PCT/EP2015/074614
§ 371 (c)(1),
(2) Date: Apr. 21, 2017

(87) PCT Pub. No.: WO2016/062864
PCT Pub. Date: Apr. 28, 2016

(65) Prior Publication Data
US 2017/0343049 A1 Nov. 30, 2017

(30) Foreign Application Priority Data
Oct. 23, 2014 (DE) .......................... 10 2014 015 717

(51) Int. Cl.
*F16D 1/116* (2006.01)
*F16D 1/104* (2006.01)
*F16D 1/10* (2006.01)
*F16B 21/07* (2006.01)

(52) U.S. Cl.
CPC .............. *F16D 1/116* (2013.01); *F16D 1/104* (2013.01); *F16B 21/078* (2013.01); *F16D 2001/103* (2013.01)

(58) Field of Classification Search
CPC .... F16D 1/0805; F16D 1/0811; F16D 1/0829; F16D 1/0835; F16B 21/065; F16B 21/18;
(Continued)

(56) References Cited

U.S. PATENT DOCUMENTS 4,136,982 A * 1/1979 Sagady .................... F16D 1/06
403/108
5,564,838 A * 10/1996 Caillault ............... F16B 21/183
384/448
(Continued)

FOREIGN PATENT DOCUMENTS

CN 101292093 A 10/2008
CN 203570863 U 4/2014
(Continued)

OTHER PUBLICATIONS

International Search Report and Written Opinion dated Jan. 26, 2016 of corresponding application No. PCT/EP2015/074614; 12 pgs.
German Office Action dated Aug. 6, 2015 of corresponding application No. 10 2014 015 717.2; 5 pgs.
German Office Action dated Dec. 18, 2015 of corresponding application No. 10 2014 015 717.2; 4 pgs.
(Continued)

*Primary Examiner* — Michael P Ferguson
(74) *Attorney, Agent, or Firm* — Maier & Maier, PLLC

(57) ABSTRACT

A torque transmission arrangement in a motor vehicle drive train, having a radially inner shaft and a radially outer hub, which are joined together in torque-transmitting manner by a plug-in toothed gearing with play, in which the plug-in gearing, and shaft outer teeth cooperate with hub inner teeth. In order to avoid gear teeth clattering, and to provide a freedom from play in the plug-in gearing, a spring element is provided, with which the shaft and can be braced against each other. In order to produce the freedom from play, the hub includes a support portion against which the spring element is supported with a spring force, building up a tilting moment by which the hub can tilt with respect to the shaft in the axial direction.

8 Claims, 4 Drawing Sheets

(58) Field of Classification Search
CPC .............. F16B 21/183; Y10T 403/587; Y10T 403/7033; Y10T 403/7035; Y10T 403/7026
See application file for complete search history.

(56) References Cited

U.S. PATENT DOCUMENTS

| | | | |
|---|---|---|---|
| 5,807,180 A * | 9/1998 | Knodle | F16D 1/0882 403/357 |
| 6,390,925 B1 * | 5/2002 | Perrow | F16D 1/112 403/316 |
| 2003/0073502 A1 | 4/2003 | Nacam | |

FOREIGN PATENT DOCUMENTS

| | | |
|---|---|---|
| DE | 102009040002 A1 | 4/2010 |
| DE | 102010035451 A1 | 3/2011 |
| WO | 2013/178340 A2 | 12/2013 |

OTHER PUBLICATIONS

Chinese Office Action dated Nov. 27, 2018, in connection with corresponding CN Application No. 201580057346.8 (14 pgs., including machine-generated English translation).
Translation of the International Preliminary Report on Patentability dated May 4, 2017, in connection with corresponding PCT Application No. PCT/EP2015/074614 (7 pgs.).
Office Action dated Jul. 30, 2019, in corresponding Chinese Application No. 201580057346.8; 17 pages.

* cited by examiner

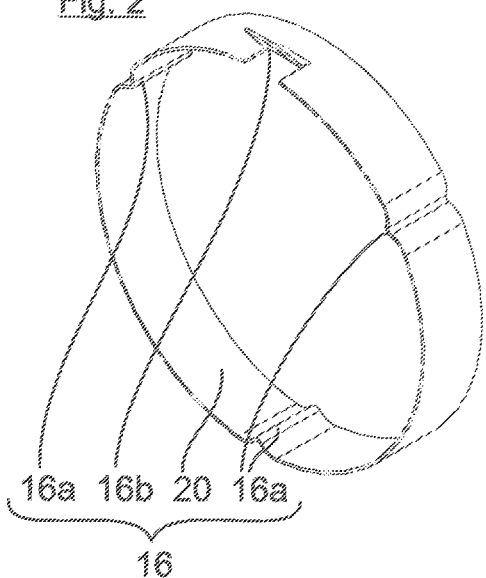
Fig. 2
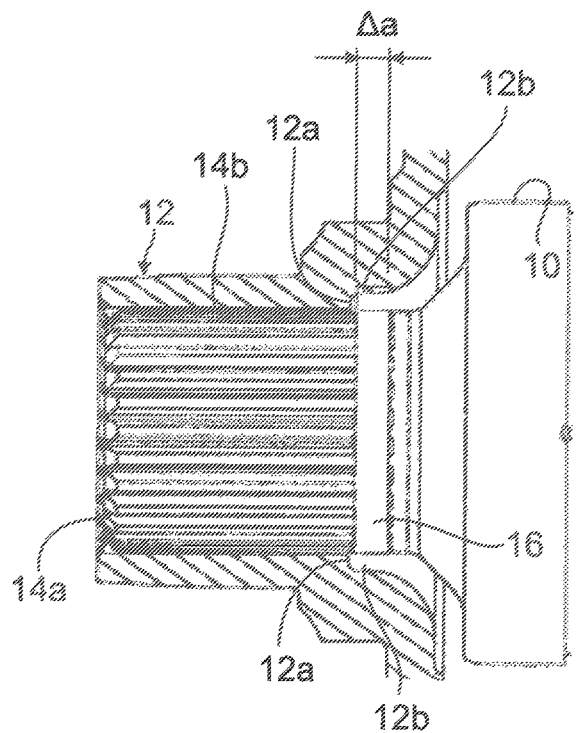
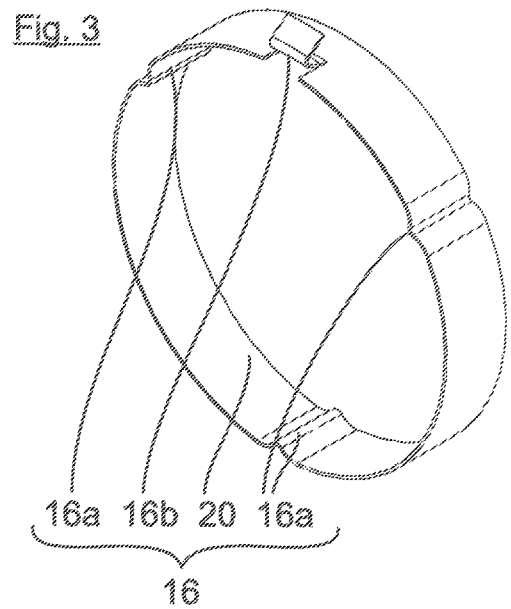
Fig. 3
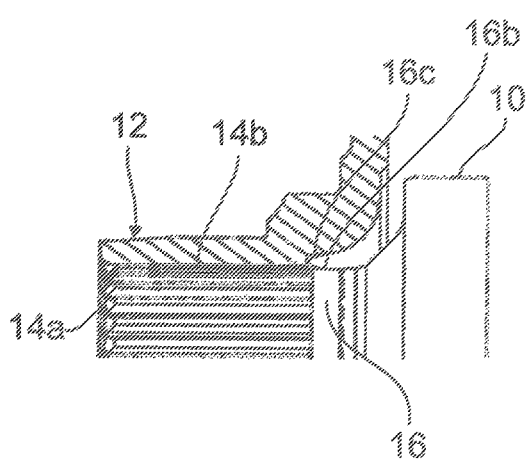

TORQUE TRANSMISSION ARRANGEMENT

BACKGROUND

Such a torque transmission arrangement is formed, for example, in a motor vehicle drive train by a gearbox input shaft and a hub of a drive flange of a dual-mass flywheel. On account of assembly tolerances, a slight installation play is present between the shaft and the hub.

From WO 2013/178340 A2 there is known a torque transmission arrangement of this kind in which a radially inner shaft and a radially outer hub are joined together in torque-transmitting manner by a plug-in toothed gearing with play. The plug-in gearing is formed by shaft outer teeth and cooperating hub inner teeth. In order to avoid acoustic anomalies (such as gear teeth clattering), i.e., in order to provide a freedom from play in the plug-in teeth, a spring element is provided, with which the shaft and the hub can be braced against each other.

In the above WO 2013/178340 A2, the angled spring element extends in axially parallel manner through the hub or its inner teeth and creates a pretensioning between shaft and hub, which for example counteracts clattering noise during torque-free drive operation (idling, etc.). The pretensioning acts in the circumferential direction or in the rotational direction, that is, tangentially to the shaft/hub. For the arrangement and positioning of the spring element, corresponding recesses which are complex and costly in their fabrication must be provided in the inner teeth of the shaft.

SUMMARY OF THE DISCLOSURE

The object of the invention is to provide a torque transmission arrangement in which a spring element can be installed in a structurally simple manner, especially without providing corresponding recesses, and which can be retrofitted for existing drive system connections if desired.

Advantageous and especially expedient embodiments of the invention are the subject matter of the dependent claims. According to invention, in order to produce the freedom from play, the hub comprises a support portion against which the spring element is braced with a spring force, building up a tilting moment by which the hub is no longer clamped against the shaft in the circumferential direction, but instead can tilt with respect to the shaft in the axial direction. Furthermore, the invention makes it possible to realize a design in which the teeth of the plug-in teeth can be displaced axially for an axial compensation.

In regard to easy retrofitting of the spring element, it is advantageous for the support portion to be positioned outside of the hub inner teeth. The hub-side support portion can adjoin the hub inner teeth directly in an axial prolongation.

In one technical implementation, the hub can be shoved by its inner teeth onto a shaft end piece. In such a case, the spring element can be positioned on a hub end face away from a shaft end face, that is, spaced apart from the shaft end face by a lengthwise or axial offset.

In a structurally simple design, the support portion can be an encircling annular surface, especially a smooth cylindrical surface, facing the shaft. The hub-side annular surface can be larger in diameter when compared to the hub inner teeth, especially when compared to its root diameter. The transition between the hub inner teeth and the support portion can be formed by an annular shoulder with a shoulder surface substantially perpendicular to the axial direction, passing into the annular surface (that is, the support portion) at an encircling inside corner.

For the positioning of the spring element, an annular space can be formed between the shaft and the hub-side support portion, in which the spring element is arranged. Preferably, the annular space can be bounded radially on the inside by the outer teeth, that is, the outer teeth, when viewed in the axial direction, extend beyond the hub inner teeth with an excess dimension and overlap the support portion in the axial direction.

In one technical implementation, the spring element braced between the hub support portion and the shaft can have a circular ring-shaped spring washer body and at least one protrusion projecting out from it radially inward and/or outward. The spring washer body can be shoved onto the shaft by its inner side or alternatively shoved onto the hub support portion by its outer side.

When the spring washer body has been shoved onto the shaft, a radially outwardly projecting resilient protrusion can be braced against the hub support portion. In this way, with a simple design of the spring element, a continuous toothed gearing possibly already in use can be employed. The assembly of the plug-in connection can be performed easily and reliably, wherein first only the spring washer is shoved onto the shaft and then the connection is produced with the hub, for example, of a drive element in the drive train of a motor vehicle.

The radially outward or inward projecting protrusion in the spring washer body can be formed in especially simple structured manner by a spring tongue cut out from a band-shaped spring washer, preferably being bent in V-shape in cross section and with radially outer (or inner) spring legs in the mounting direction. The spring tongue provides both frictional locking in the circumferential direction (if any circumferential play is present) and also increases the play compensation by a one-sided tilting moment, so that gear teeth noises can be avoided.

In an alternative embodiment of the invention, the radially projecting protrusion can be formed by a cam-shaped formation of the spring washer, which can ensure sufficiently high pretensioning forces in the connection with an easily fabricated design, especially if the cam-shaped formation is produced by overlapping end regions of an open-design spring washer body.

In another advantageous embodiment of the invention, for example, the spring washer body, which has been shoved onto the shaft outer teeth, can have at least one fixation in the circumferential direction engaging in a groove of the outer teeth of the shaft. This ensures that the spring washer (or the spring washer body) cannot perform an unintentional relative twisting with respect to the shaft and hub and/or it can take up a defined mounting position; more preferably, three fixations distributed in the circumferential direction can be provided for this.

The fixations can preferably be formed by radially inwardly projecting indentations molded in the spring washer and produced without machining cutting.

Finally, it is proposed that in the mounted state of the connection, the spring washer is positioned in the axial direction between an annular shoulder in the hub and a collar of the shaft adjacent to the outer teeth of the shaft. Consequently, the spring washer is reliably held in the axial direction and can even act as a stop member during the assembly of the shaft/hub connection or on the plug-in gearing.

The above-explained advantageous embodiments and/or enhancements of the invention, and/or those reproduced in the dependent claims, can be used alone or also in any desired combination with each other, except, for example, in cases of clear dependencies or irreconcilable alternatives.

BRIEF DESCRIPTION OF THE DRAWING

Shown herein:

FIG. 2 in a longitudinal section, the shaft/hub connection according to FIG. 1 and next to it the spring element used with cut-out spring tongue in individual three-dimensional representation;

FIG. 3 a shaft/hub connection modified from FIG. 2, having a V-shaped projecting spring tongue of the spring element in cross section;

DETAILED DESCRIPTION OF THE DRAWING

Figure 1:
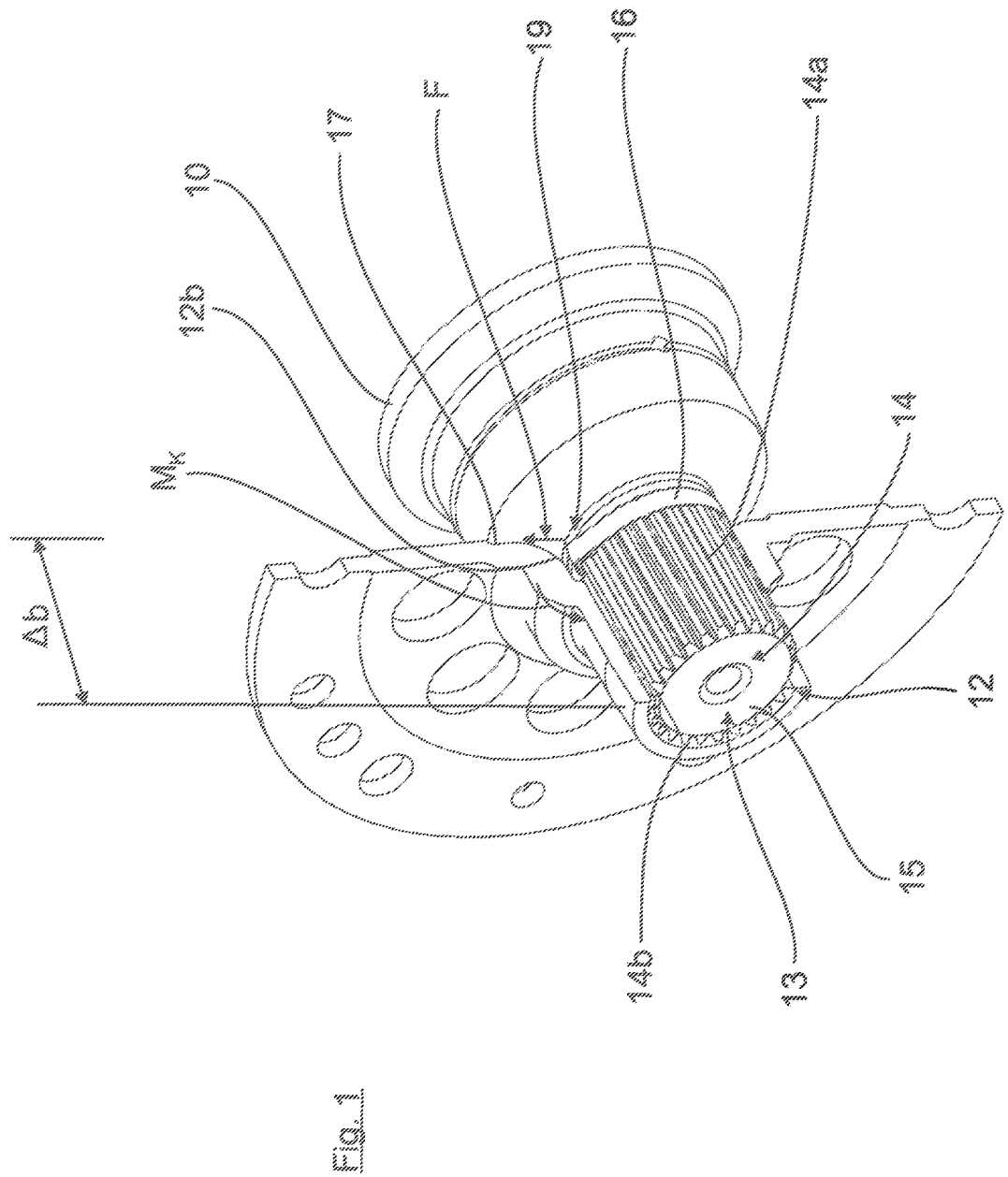
FIG. 1 an only partly represented drive device in a drive train for motor vehicles, having a shaft and a drive flange, which are coupled together by means of a plug-in gearing, and also having a ring-shaped spring element between shaft and hub.

FIG. 1 shows in part a torque transmission arrangement between a shaft 10 and a hub 12, which are joined together to transmit torque by means of a plug-in gearing 14. The shaft 10 (for example, a gearbox drive shaft or output shaft) has for this purpose axially parallel outer teeth 14a, which engage with the inner teeth 14b of the hub 12. The hub 12 can be part of a drive flange inside a dual mass flywheel or part of a Cardan shaft in the drive train of motor vehicles.

The drive connection shown is easily assembled by shoving the hub 12 onto it or by pushing the shaft 10 into it. Even when close tolerance limits are maintained, a slight installation play is unavoidable.

In order to counteract any tooth clattering which occurs in the plug-in connection 14 especially in the torque-free drive operation, a ring-shaped spring element 16 such as one made of spring steel is provided between the hub 12 and the shaft 10, which braces shaft 10 and hub 12 against one another and furthermore exerts a tilting moment $M_K$ due to its off-center positioning.

In FIG. 1, the hub 12 is shoved by its inner teeth 14b onto a shaft end piece 13. The spring element 16 here is positioned on a hub end face 17, away from a shaft end face 15, that is, spaced apart from the shaft end face 15 by a length offset Δb.

In FIG. 2, the shaft/hub connection is shown at the right in longitudinal section and the spring element 16 at the left, in spatial illustration. Accordingly, the spring element 16 has a band-shaped spring washer body 20 as well as three fixations or indentations 16a projecting radially inward thereform, having a definite circumferential distribution on the outer teeth 14a so that they engage, free of play, in tooth gaps of the outer teeth 14a.

Moreover, the spring element 16 in FIG. 1 has a radially outwardly projecting protrusion or a spring tongue 16b, which lies axially outside the hub inner teeth 14b (see longitudinal section of FIG. 1) against an annular shoulder 12a and pretensions the support portion 12b of the hub 12, adjacent to the inner teeth 14b and larger in diameter, against the shaft 10 in the radial direction. The spring tongue 16b is preferably cut out from the band-shaped spring washer body 20 and exhibited accordingly. Alternatively, the spring element 16 may be fabricated not in a cutting process, but rather by bending a wire, again as an example.

The spring washer body 20 can be held axially on the shaft 10 or the outer teeth 14a by the fixations 16a. Optionally, however, a collar (not shown) adjoining the outer teeth 14a can also be provided on the shaft 10, against which the spring washer body 20 touches.

In the following, the component geometry of the torque transmission arrangement shall be described in detail: thus, the aforementioned support portion 12b is formed on the inner circumference of the hub 12, against which the spring element 16 is braced with a spring force F (FIG. 1), building up the tilting moment $M_K$, by which the hub 12 can be tilted in the axial direction relative to the shaft 10, i.e., it can be tilted from its coaxial position. The support portion 12b is positioned outside of the hub inner teeth 14b and directly adjoins the hub inner teeth 14b in an axial prolongation with an excess dimension Δa (FIG. 2). In the exemplary embodiment shown, the support portion 12b is a smooth cylindrical and encircling annular surface, facing the shaft 10. The latter is larger in diameter when compared to the root diameter of the hub inner teeth 14b. The hub inner teeth 14b pass into the annular surface 12b at an annular shoulder 12a with shoulder surface perpendicular to the axial direction. In this way, an annular space 19 (FIG. 1) is formed between the shaft 10 and the annular surface 12b (that is, the hub-side support portion), in which the spring washer 16 is arranged. The annular space 19 is bounded radially on the inside by the shaft outer teeth 14a.

The drive connection is assembled by first shoving the spring element 16 onto the outer teeth 14a of the shaft 10 with a defined shoving force. Then the hub 12 (or conversely the shaft 10) is coupled by the plug-in connection 14 to the shaft 10. Since the spring element 16 is positioned axially outside of the inner teeth 14b, the plug-in gearing 14 can have a conventional design (that is, without any recesses for the spring element 16).

FIG. 3 shows an embodiment of the spring element 16 which has been modified from FIG. 2, in which the spring tongue 16b is angled with a V-shape and acts on the hub 12 by a radially outer leg 16c (see longitudinal section of FIG. 3).

The V-shape configuration of the spring tongue 16b, 16c may be advantageous when bridging large radial distances between the hub 12 and the shaft 10 and/or to facilitate the assembly process.

Figure 4:
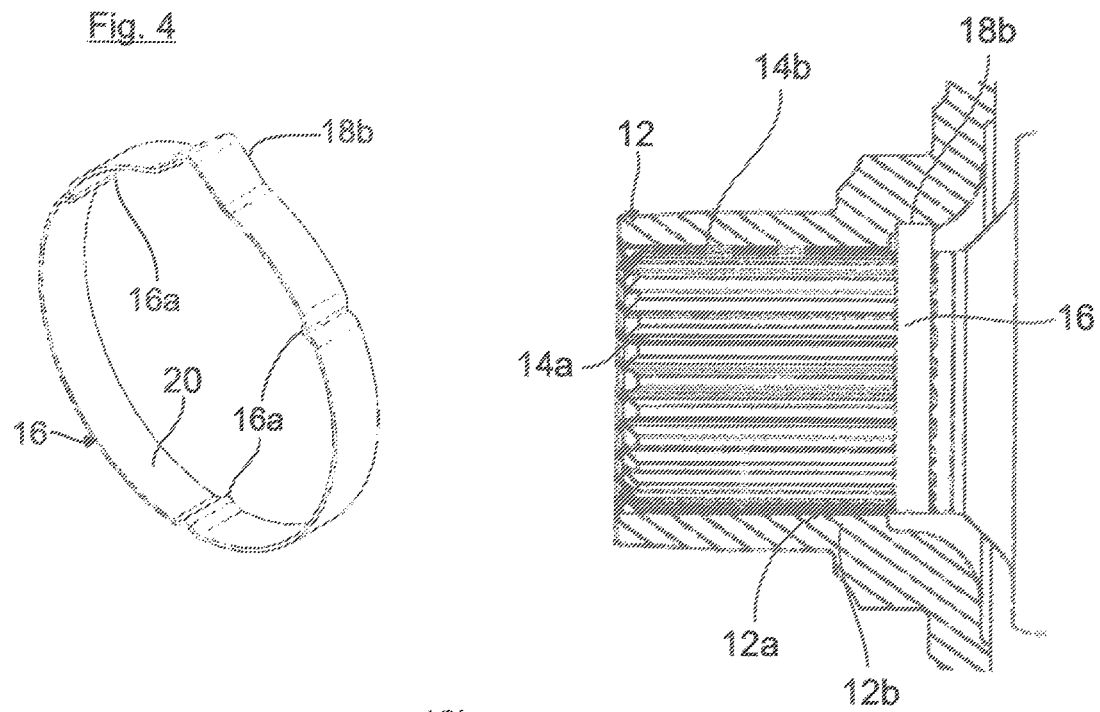
FIG. 4 a shaft/hub connection alternative to FIGS. 2 and 3, having a spring element with a radially outward projecting, cam-shaped protrusion.
Figure 5:
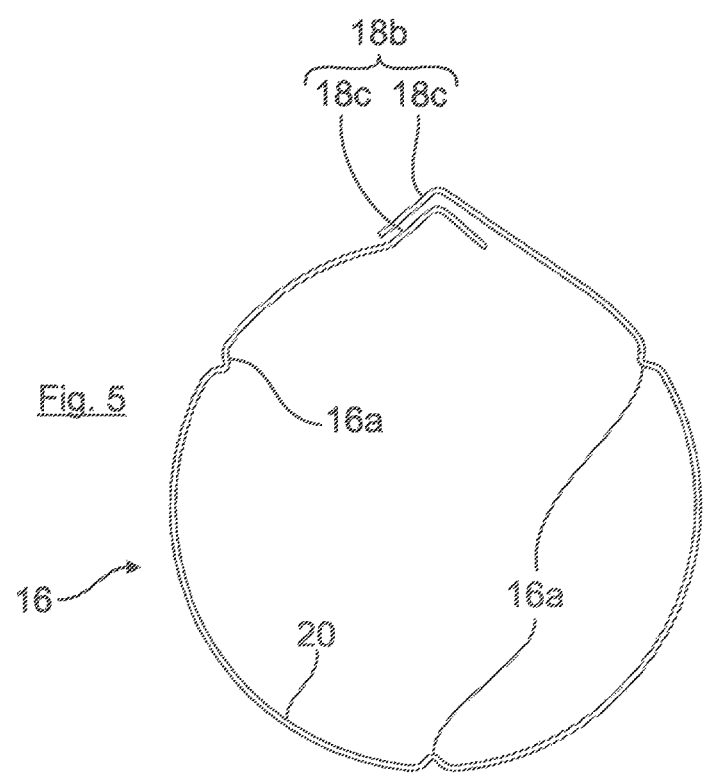
FIG. 5 a spring element modified from FIG. 4 in sections, whose projection is formed by overlapping end regions of an open spring washer.

FIGS. 4 and 5 show embodiments of the spring element 16 that are alternatives to FIGS. 2 and 3, having a band-shaped spring washer 20, whose radially outwardly projecting protrusion is produced by a cam-shaped formation 18b (FIG. 4) or 18c (FIG. 5).

According to FIG. 4, the spring washer body 16 is provided with fixations 16a, as described above for FIGS. 2 and 3. The formation 18b is designed (compare the longitudinal section of FIG. 4) so that, by springlike application against the hub 12 or the radially widened support portion 12b, the hub 12 is clamped against the shaft 10.

FIG. 5 shows a portion of a spring washer body 16 which has been modified from FIG. 4, having an open design, and whose roughly V-shaped angled and overlapping end regions 18c shape the formation 18b. If desired, the end regions 18c can be integrally joined to each other.

With this version of the spring washer body 20 as modified from FIG. 4, an even greater clamping can be produced between the shaft 10 and the hub 12 or inside the plug-in gearing 14.

The invention is not limited to the exemplary embodiments shown. If desired, several radially projecting protrusions 16b, 18b may also be provided on the spring elements 16, being positioned in a defined circumferential distribution and acting by both friction locking (in the context of any play present in the teeth) in the circumferential direction and by force fitting in the radial direction.

The spring elements 16 may also have a different cross-sectional shape (for example, a wire shape) and can also be designed without fixations 16a by an appropriate press fit on the outer teeth 14a.

Figure 6:
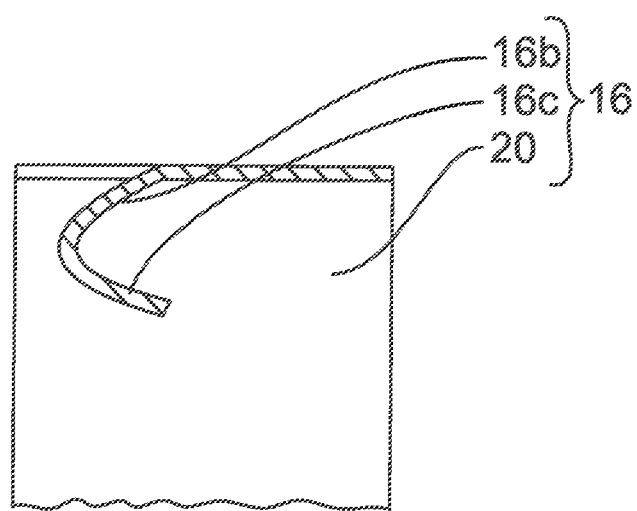
FIG. 6 another embodiment example of the spring element in a partial view.

FIG. 6 shows another exemplary embodiment of a spring element 16. In contrast to the previous figures, the resilient protrusion 16b in FIG. 6 does not project radially outward, but instead radially inward. During assembly, therefore, the spring washer body 20 is shoved by its outer side onto the hub support portion 12b, so that the protrusion 16b is supported on the shaft 14.

The invention claimed is:

1. A torque transmission arrangement in a motor vehicle drive train, comprising:
   a radially inner shaft having outer teeth;
   a radially outer hub having inner teeth and an annular support portion comprising an inwardly-facing cylindrical surface adjoining the inner teeth in an axial direction;
   wherein the shaft outer teeth cooperate with hub inner teeth in a torque-transmitting manner with play, and wherein an annular space is formed between the shaft outer teeth and hub support portion; and
   a spring element provided within the annular space of the hub support portion, with which the shaft and the hub can be braced against each other in order to avoid gear teeth clattering and to prevent play in the gearing between the inner and outer teeth, the spring element comprising a band-shaped spring washer body having at least one radially-inwardly projecting indentation engaging a tooth gap of the shaft outer teeth, and a resilient radially-outwardly projecting protrusion comprising a spring tongue cut-out from the spring washer body;
   wherein in order to prevent play in the gearing, the protrusion is supported with a spring force against the hub support portion, building up a tilting moment by which the hub can tilt with respect to the shaft in the axial direction.

2. The torque transmission arrangement according to claim 1, wherein the hub is shoved by its inner teeth onto a shaft end piece, and the spring element is positioned on a hub end face away from a shaft end face, and/or the spring element is spaced apart from the shaft end face by an axial-lengthwise offset.

3. The torque transmission arrangement according to claim 1, wherein the hub annular surface is larger in diameter when compared to the hub inner teeth, when compared to its root diameter, and in that the hub inner teeth pass into the annular surface at an annular shoulder with the shoulder surface substantially perpendicular to the axial direction.

4. The torque transmission arrangement according to claim 1, wherein the spring tongue is V-shaped in cross section with a radially outward spring leg.

5. The torque transmission arrangement according to claim 1, wherein the spring washer body sits on or is shoved by its inner side onto the shaft outer teeth, or the spring washer body sits or is shoved by its outer side onto the hub support portion.

6. The torque transmission arrangement according to claim 1, wherein in a mounted state of the connection, the spring washer is positioned in the axial direction between the hub annular shoulder and a collar of the shaft adjacent to the outer teeth of the shaft, which is larger in diameter when compared to the spring washer.

7. A torque transmission arrangement in a motor vehicle drive train, comprising:
   a radially inner shaft having outer teeth;
   a radially outer hub having inner teeth and an annular support portion comprising an inwardly-facing cylindrical surface adjoining the inner teeth in an axial direction;
   wherein the shaft outer teeth cooperate with hub inner teeth in a torque-transmitting manner with play, and wherein an annular space is formed between the shaft outer teeth and hub support portion; and
   a spring element provided within the annular space of the hub support portion, with which the shaft and the hub can be braced against each other in order to avoid gear teeth clattering and to prevent play in the gearing between the inner and outer teeth, the spring element comprising a band-shaped spring washer body having at least one radially-inwardly projecting indentation engaging a tooth gap of the shaft outer teeth, and end regions which overlap each other, in a circumferential direction, so that the overlapped end regions form a resilient radially-outwardly projecting protrusion;
   wherein in order to prevent play in the gearing, the protrusion is supported with a spring force against the hub support portion, building up a tilting moment by which the hub can tilt with respect to the shaft in the axial direction.

8. The torque transmission arrangement according to claim 7, wherein the protrusion is a cam-shaped formation of the spring washer body, and the cam-shaped formation is produced by overlapping end regions of the spring washer body.

* * * * *